United States Patent
Herbst

(10) Patent No.: US 6,776,104 B2
(45) Date of Patent: Aug. 17, 2004

(54) STAND FOR VIDEO DRIVING GAME

(76) Inventor: Jerry Herbst, 8710 Harloran La., Dayton, OH (US) 45414

(*) Notice: Subject to any disclaimer, the term of this patent is extended or adjusted under 35 U.S.C. 154(b) by 470 days.

(21) Appl. No.: 09/752,315

(22) Filed: Jan. 2, 2001

(65) Prior Publication Data

US 2002/0185041 A1 Dec. 12, 2002

(51) Int. Cl.[7] ............................................... A47B 85/00
(52) U.S. Cl. ............................ 108/25; 108/43; 273/309
(58) Field of Search ........................... 108/43, 150, 25; 273/309, 148 R, 459, 461; 248/127, 133, 146, 158, 371, 176.1

(56) References Cited

U.S. PATENT DOCUMENTS

| | | | | |
|---|---|---|---|---|
| 925,284 A | * | 6/1909 | Buck | |
| 4,489,938 A | * | 12/1984 | Darzinskis | |
| 4,494,754 A | * | 1/1985 | Wagner, Jr. | |
| 4,518,164 A | * | 5/1985 | Hayford, Jr. | |
| 4,630,823 A | * | 12/1986 | Grant | |
| 5,207,791 A | * | 5/1993 | Scherbarth | |
| 5,419,263 A | * | 5/1995 | Mills | |
| 5,615,620 A | * | 4/1997 | Owen | |
| 5,771,613 A | * | 6/1998 | Geils et al. | |
| 6,044,772 A | * | 4/2000 | Gaudette et al. | |
| 6,159,099 A | * | 12/2000 | Chen | |
| 6,251,015 B1 | * | 6/2001 | Caprai | |
| 6,279,906 B1 | * | 8/2001 | Sanderson et al. | |

* cited by examiner

Primary Examiner—Jose V. Chen

(57) ABSTRACT

A stand to position the driving module for a video game has a support platform. The support platform arranges the support column, and an adjustable plane to position the accelerator module and a lever to allow the support column to be turned. The top end of the hollow support column has a support base with a reversible attachment for the driving module. The hollow support column provides a convenient way of keeping the interconnection wires in an isolated place. One embodiment of the Improved Stand provides a support for a video monitor.

13 Claims, 6 Drawing Sheets

STAND FOR VIDEO DRIVING GAME

FIELD OF THE INVENTION

The present invention provides a support stand for the consoles of video games which simulate driving a car such as a racing car. Likewise, the present invention can be readily adapted to provide the illusion of driving a motorcycle or flying an airplane. The present Improved Stand provides a more realistic simulation of the projected events of a computer game. More specifically the present invention describes a support stand for a computer game control device, especially a device with a steering wheel to provide the illusion of driving. Further the present invention provides an adjustable slot for such accessories as an accelerator and a brake to be used by the foot as well as a cup holder. Likewise, a support for the video monitor is optimal.

BACKGROUND OF THE INVENTION

Almost as soon as the computer chips became cheap enough to be put into games, the toy industry provided various games wherein simple action figures and events could be controlled by such means as a "joystick" or a push button that controls electronic switches that simulate movement.

One format of early (and still common computer game format) involves the simulation of racing with racing cars in various electronically created race tracks. Typically, these "race cars' are controlled by buttons or "joysticks." However, several manufacturers provide a physical "steering wheel" which moves the electronic cars of the computer game. Two common examples of such "Steering Wheel" simulations are the Hot Wheels by Mattel and Concept 4 racing wheel for Sega Dreamcast.

While the steering wheel console provides an improvement in the illusion of driving when compared with the joysticks and buttons, the steering wheel computer game console still leaves much to be desired. More precisely the steering wheel computer game console exists as a unit. The console may be on a lap or on a table while playing the game.

Gaudette U.S. Pat. No. 6,044,772 teaches that a stand with a mounting platform, which platform can be adjusted to varying heights and which platform has a means of attaching the video control mechanisms to hold the video control mechanism in place.

More accessories are useful to more fully create the illusion of driving a car, or motorcycle, or flying an airplane. For example, controlling a vehicle required foot peddles, such as accelerator peddles and brake peddles in automobiles. Such peddles are provided by both Hot Wheels by Mattel and Concept 4 racing wheel for Sega Dreamcast. Driving a car requires shifting gears. For example, such a gear shift is provided by Madcatz console system.

That is to say that even though U.S. Pat. No. 6,044,772 provides a support stand for a game driving wheel, further elements can make this driving illusion more realistic.

DETAILED DESCRIPTION OF FIGURES

Figure 1:
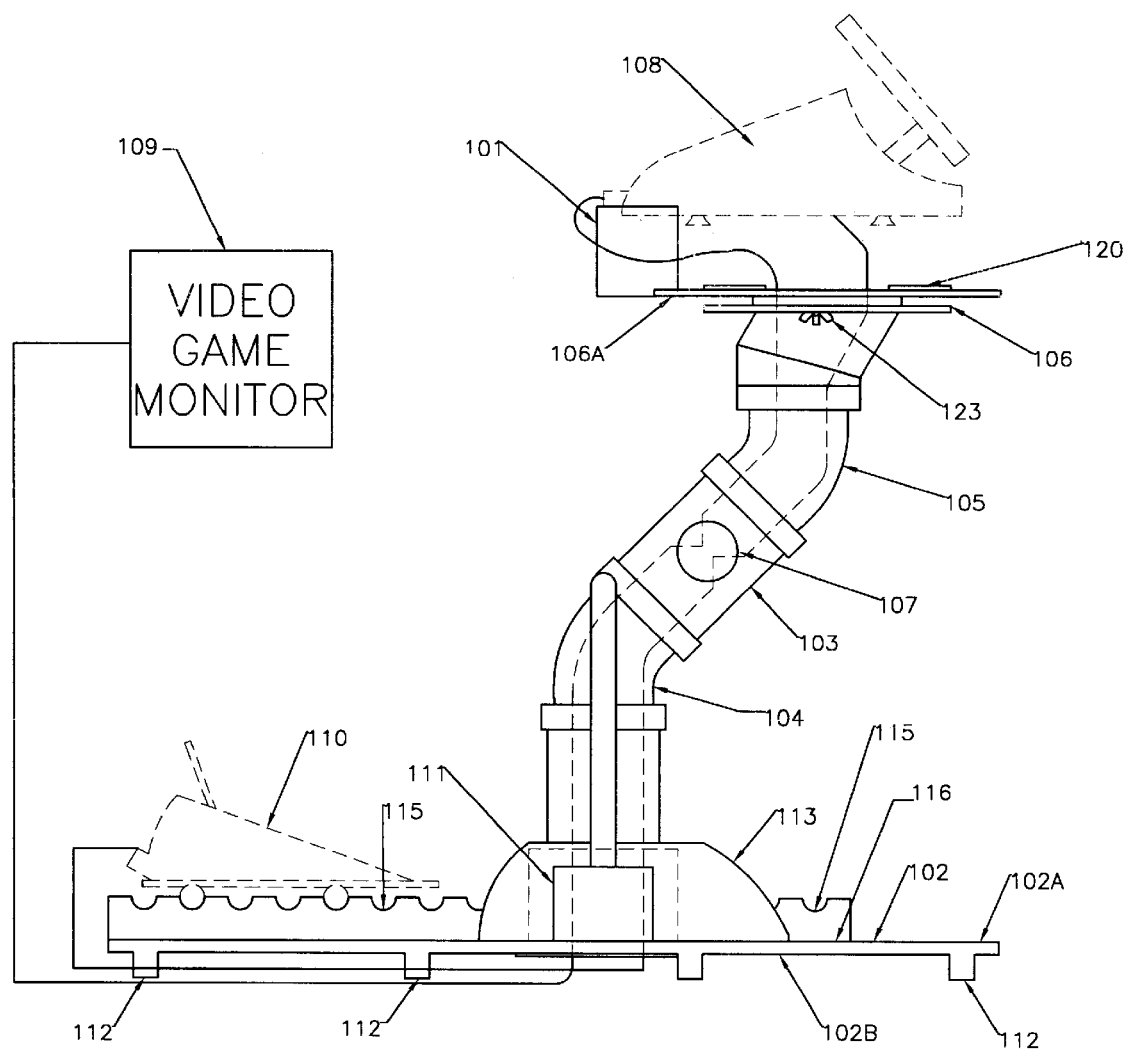
FIG. 1 is a lateral view of the Improved Stand for Video Driving Games. This Figure shows bosses for legs for the floor platform, a hollow support column with the two complementary angle unions the support base for a workpiece, (driving module). Likewise, shown is the lever to allow the turning of the support, adjustable means to affix the accelerator pedals module (a second workpiece,) and the Video game monitor (the third workpiece).

FIG. 1 shows a side view of the Improved Stand 101 for a Video Game. This devices comprises a Floor Platform 102 with a top surface 102-A and a lower surface 102-B. Lower platform end of hollow support column 103 attaches to top surface 102-A. In the particular embodiment shown there is a first angle union 104 and a second union angle 105. It is to be noted that these complimentary angle unions are not required for the invention but provide a more convenient presentation for the Improved Stand. The support column 103 affixes the support base 106 to the upper end of the support column 103. The support column 103 is hollow to provide a passageway for the workpiece wires 107 which connect the workpiece driving module 108 with the workpiece video 109, and workpiece accelerator-brake 110. Bosses 112 provide legs attached to the lower surface 102-B. Of course, wheels would be used instead foot legs in the Improved Stand. To improve the stability of the column 103, a support collar 113 is affixed on the top surface 102-A of floor platform 102 or through the floor platform. It is to be noted that it is optional that support column 103 can physically rotate to allow the player to more readily seat himself. This is provided by conventional lever and pawl design. The lever to move the pawl is shown as 111.

Flat smooth raised pads 120 provide a space between the driving module 108 and the top surface area 106. The commercially purchased driving module which is the heart of the driving game typically has either bosses or suction cups on it underside. The smooth raised pads 120 provide a placement area for the bosses or suction cups. In a preferred embodiment top surface top surface 106-A and bottom surface 106-B is not provided by a single plate but are two plates that can be adjusted, the top plate with top surface 106-A can adjust over the bottom plate with lower surface 106-B. An adjustment means such as a bolt 123 makes allows for this adjustment using slots in bottom plate with lower surface 106-B and a bolt hole in top surface plate 106-A A primary adjustable plane 211 is used to provide a means of attaching accelerator-brake workpiece 110. Grooves 115 provide a means of varying the distance of the accelerator-brake workpiece.

Figure 2:
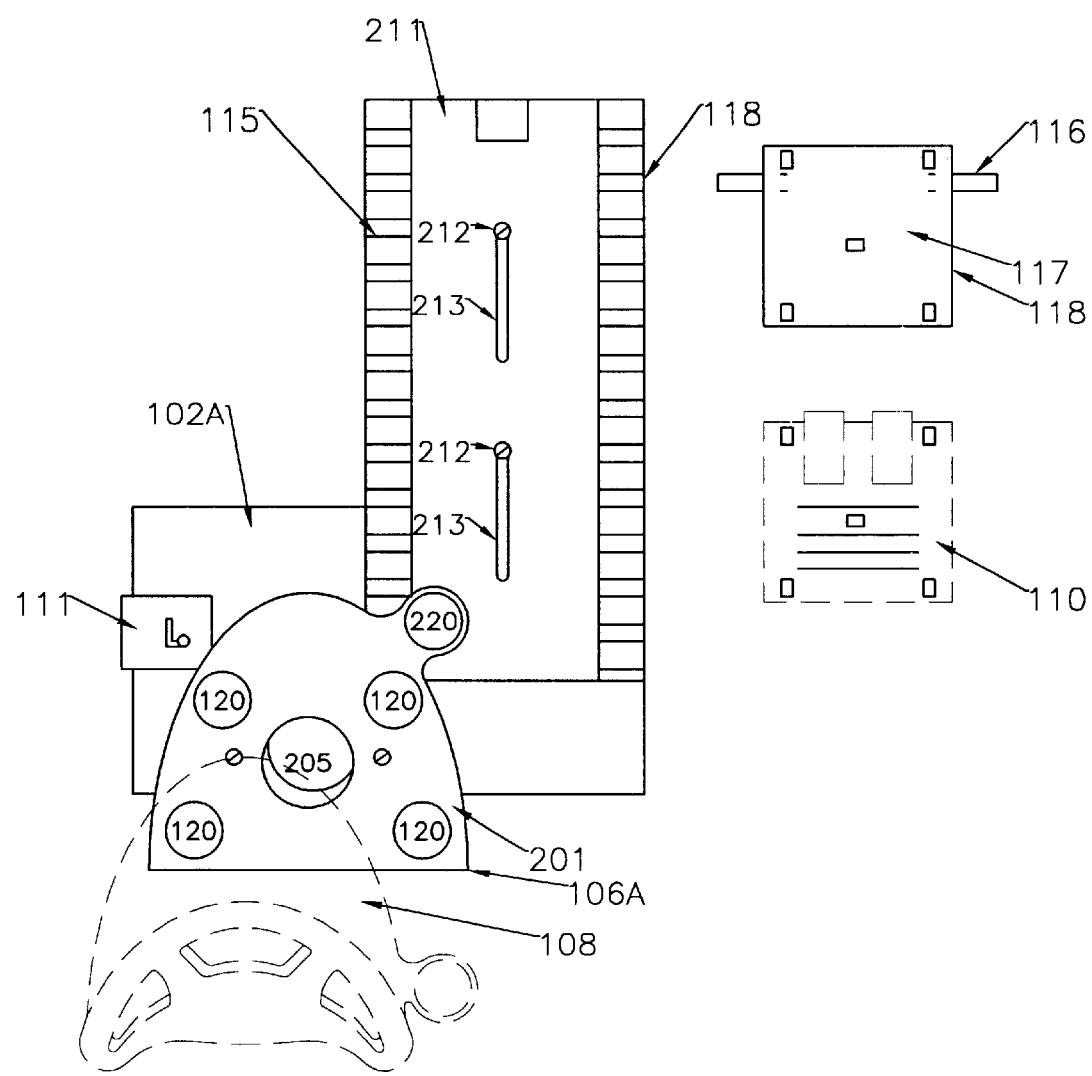
FIG. 2 shows a top view of the assembled Improved Stand. It is to be noted that a preferred embodiment of the present invention has a hollow support column to control the various wires from the various components of the workpieces. However, a solid support column could be used.

FIG. 2 show a top view of the improved stand. Shown is the ring holder 202 on the periphery of support base 201. On the topside of the support base 201 are raised areas 120. These raised areas allow the workpiece wires 107 to pass underneath the workpiece console 108 and through the hollow support column 103. Likewise, these raised areas 120 allow the attachment of the suctioncups on the underside of the workpieces console 108, shown in top outline.

Shown is a hole 205 in the support base in the support base 106 for the workpiece wires 107. A top view of the lever 111 used to allow the rotation of support column affixed to the top surface of the floor platform 102-A is shown.

To further the illusion of driving a primary adjustable plane 211 is reversibly attached to the top surface 102-A of the floor platform 102 by means of screws 212. This allows the adjustment workpiece accelerator module 110 to provide [d] for varying leg lengths of the operators. The placement of the primary adjustable plane 211 can be varied by means of slots 115 placed along the side edges of the primary adjustable plane 211 in the primary adjustable plane 212.

A pair of rods 116 is attached to a secondary adjustable plane 118. The roof 117 of the secondary adjustable plane 118 has means such as Velcro to reversible attach the accelerator workpiece 110, shown in outline. To quickly adjust the accelerator workpiece 110, the rods 116 of the secondary adjustable plane 117 are placed in the slots 115 of the primary adjustable plane 211.

Figure 3:
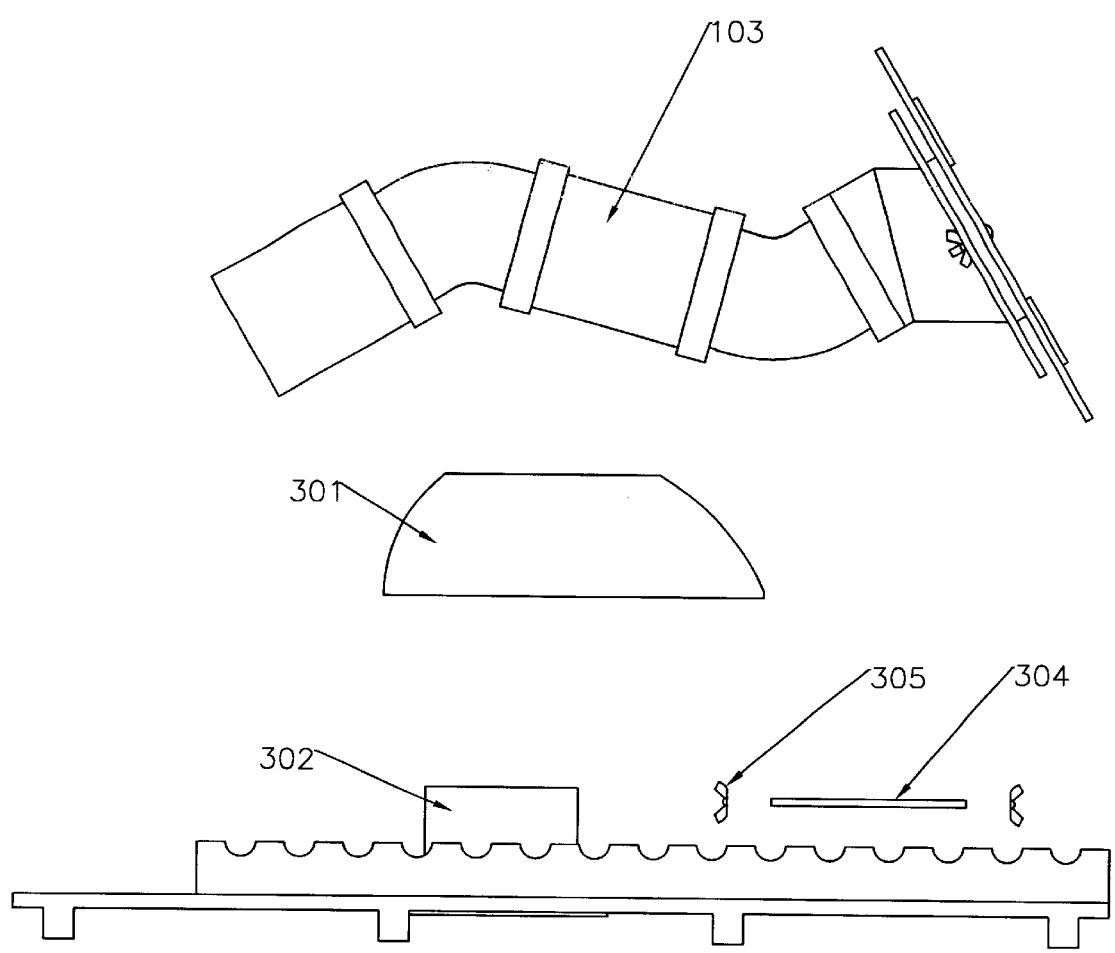
FIG. 3 show the Improved Stand disassembled.

FIG. 3 shows the support for the driving module of a driving computer game in a dissembled position. The hollow support column 103 is supported by flange 301 and support collar 302. To assemble, the support column 103 is attached to the support collar 302 by means of a nut 305 and bolt 304 through the support collar 302

Figure 4:
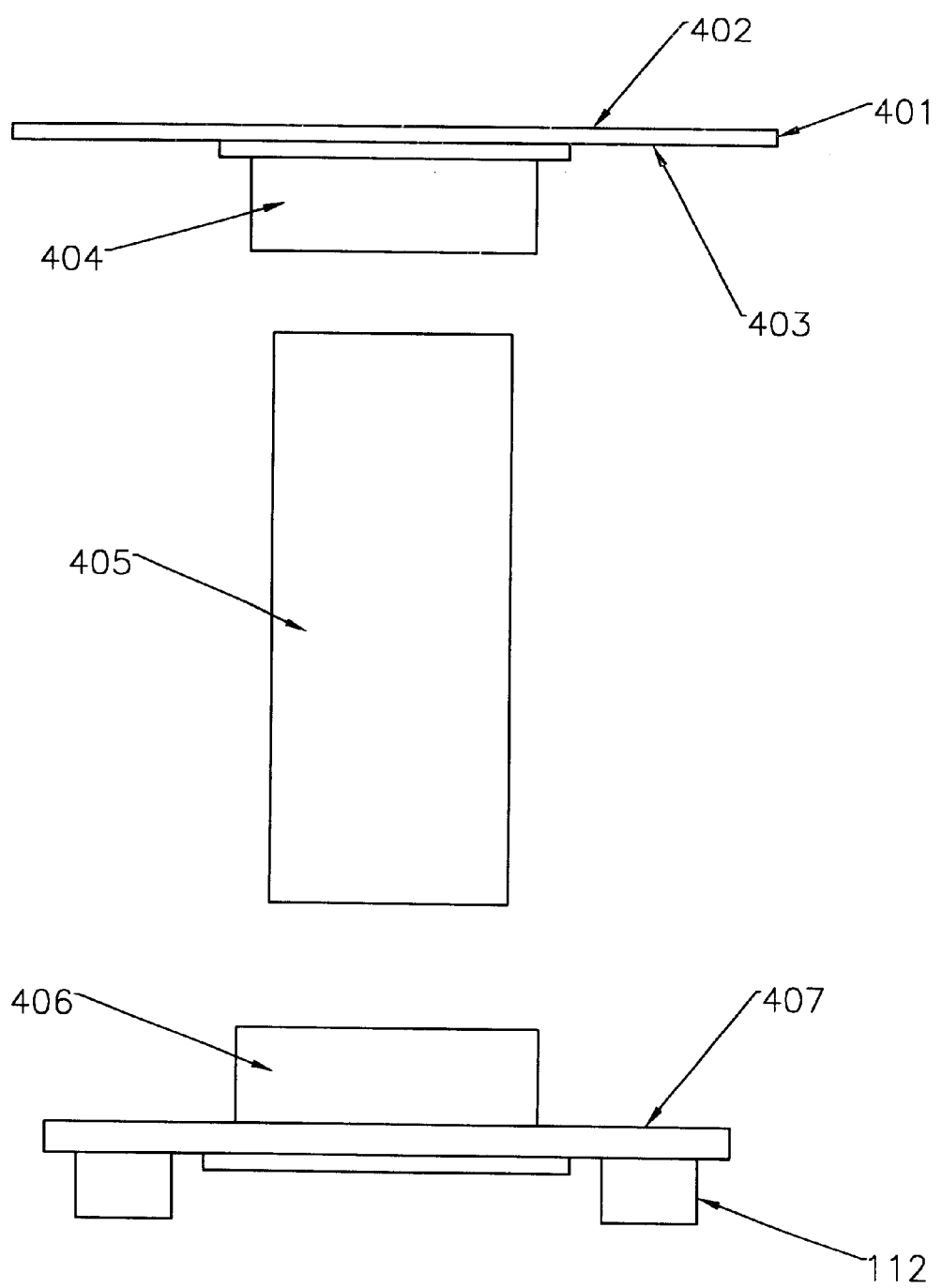
FIG. 4 shows a dissembled optional table support for a video monitor.

FIG. 4 shows a conventional construction in an exploded format of a table support for a video monitor. Shown is the table top 401 with a table top oversurface surface 402 and table top undersurface 403. Attached to table top undersurface 403 is a first support ring 404. Support ring 404 provides a more secure attachment for table column 405. Support column 405 in turn is attached to a second support ring 406. Second support ring 406 in turn is attached to the table support floor piece 407. Bosses 112 are affixed to the under surface of the table floor support piece 407.

Figure 5:
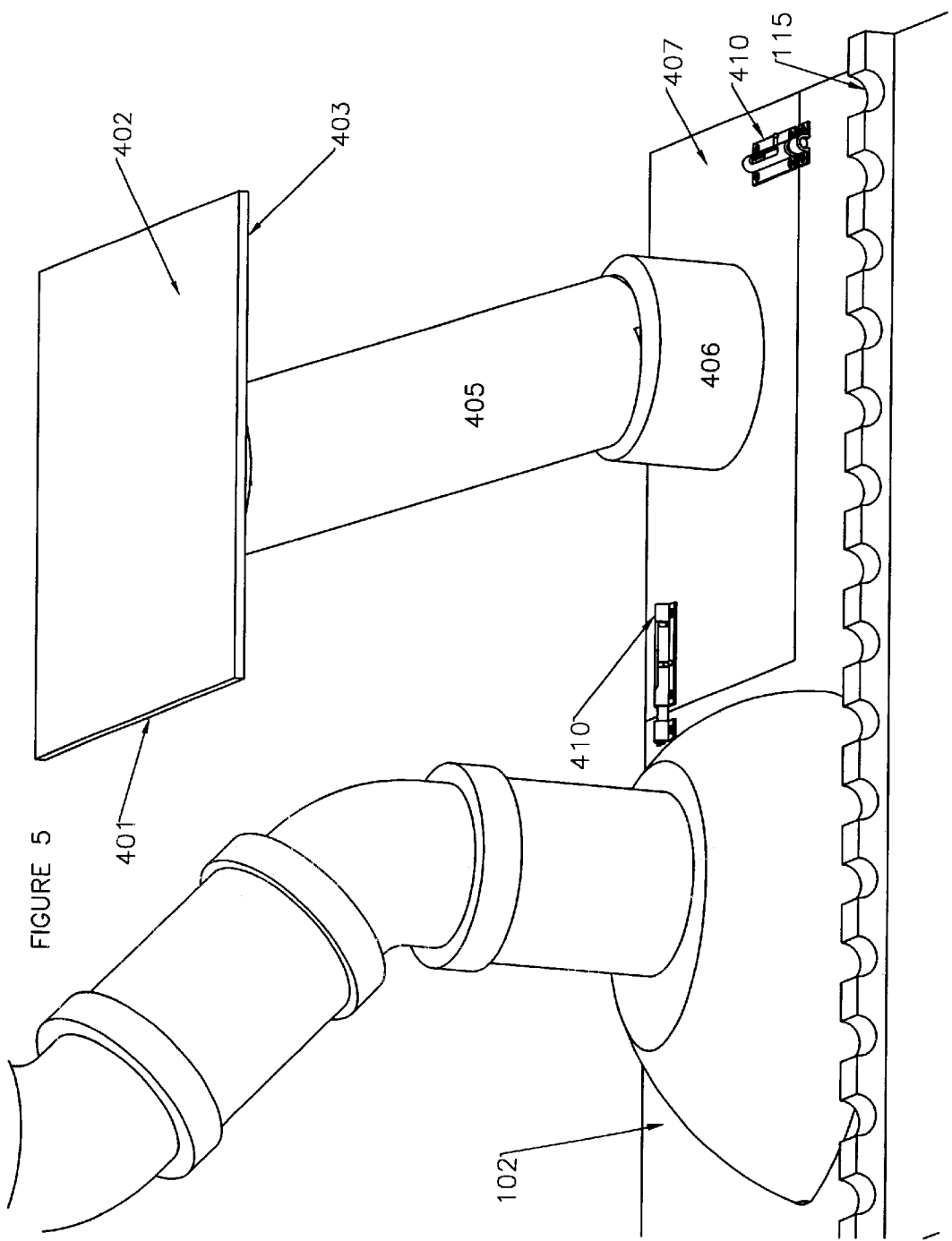
FIG. 5 shows that the optional table support can be affixed to the floor platform.

FIG. 5 show an optional means of attaching the table top 401 for the video monitor to the floor platform 102. An (optional) angled support column 405 affixes the table top 401 and in turn attaches to the table floor support piece 407. Second support ring 406 strengthens table column. Conventional attachment means such as "sliding bolt" mechanisms 410 can attach the table support platform piece 407 to the floor platform 102. Of course, the table support platform need not be a separate piece but could be part of the support platform 102.

Figure 6:
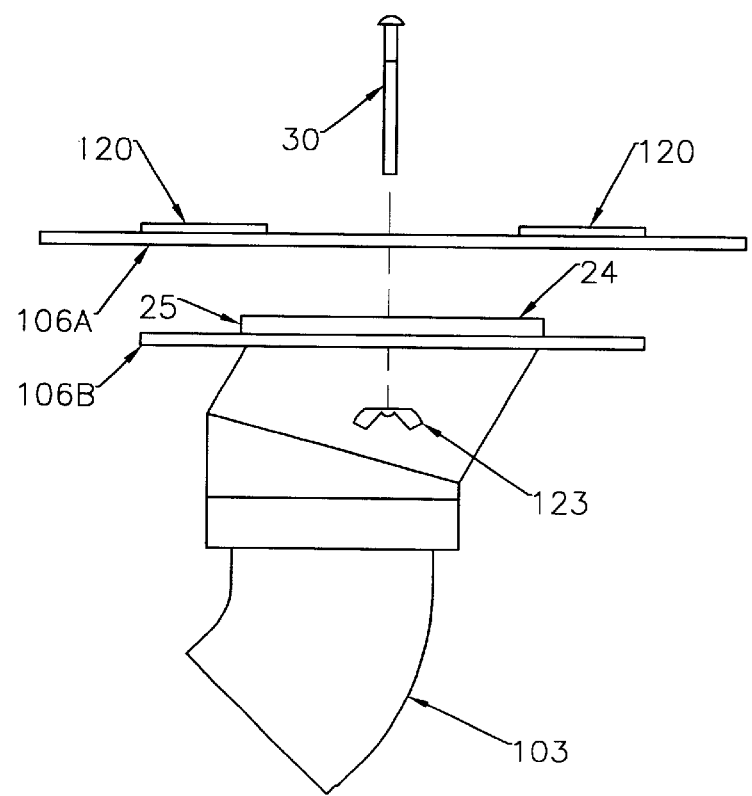
FIG. 6 is a detail of the adjustable support base plate.

FIG. 6 is a detail of the adjustable support base plate 106 with topside 106 A and bottom surface support plate 106-B. Bottom surface support plate 106 B is affixed to the upper end of column 103. A pair of raised insert dividers 24 as part of bottom surface support plate 106-B separates topside 106-A from 106-B. Bolt 30 with wing nut 123 will provide the physical pressure to affix topside 106A with bottom surface support plate 106-B.

Figure 7:
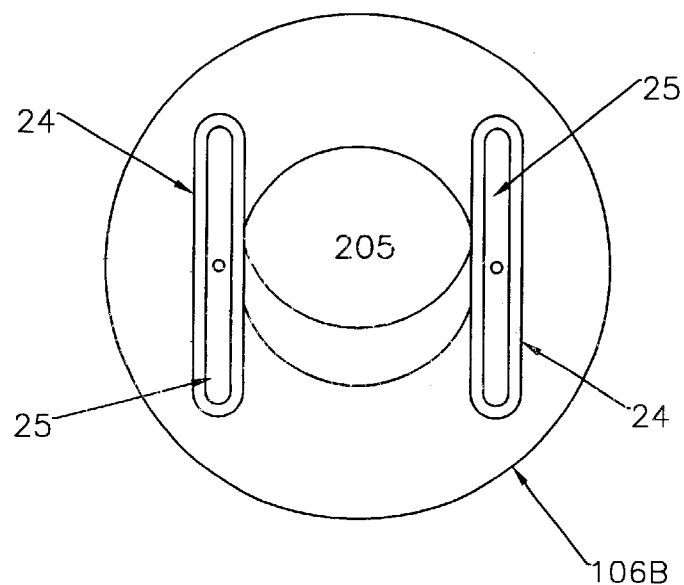
FIG. 7 is a top view of bottom support plate.

FIG. 7 shows the top view of bottom surface support plate 106-B. Shown are elongated raised insert dividers 24 with an elongated slots 25 through the insert dividers 25 and the bottom surface support plate 106-B. The elongated slots 25 allow the movement of topside 106-A relative to bottoms surface support plate 1 06B. Shown is the hole 205 in bottom surface support plate 106-B. Of course, in a simplified embodiment the adjustable support plate could be a single piece without adjustable features but with the raised areas 120.

SUMMARY OF INVENTION

An improved support for the driving module of a driving computer game has as support platform. On the support platform are: an accelerator module, an adjustable plane for the accelerator module, a means to attach a hollow support column, as well as means to attach a lever to allow the support column to turn. The support may be straight or with bends. The top end of the support column has a support base for the driving module. The support base on the upper end of the support column has a means to hold the driving console workpiece. An optional table for the video monitor is taught.

What is claimed:

1. A support for the driving module of a driving computer game comprising;

a floor platform;

a hollow support column with a lower platform end and an upper end;

said lower platform end is affixed to said floor platform;

a support base for a commercially purchased driving module (workpiece);

said support base is affixed to said upper end of said hollow support column;

a commercially purchased accelerator module base (workpiece) of the video games is affixed to the top surface of said floor platform in a cooperative manner with Velcro and rods;

said rods are placed into one of several complimentary grooves;

said complimentary grooves are on an adjustable plane which plane is adjustable and removable affixed to the upper surface of said platform with a bolt.

2. A support for the driving module of a driving computer game as recited in claim 1, whereas there are bosses affixed to the lower surface of said floor platform.

3. A support for the driving module of a driving computer game as recited in claim 1, whereas a first hole is in said support base at the p to the underside of said support base and a second hole in said floor platform at the place that said hollow column is affixed to the top surface of said floor platform.

4. A support for the driving module of a driving computer game as recited in claim 1, whereas said hollow support column has a first angle union to create a bend in said column and a second angle union to return said column to a vertical position.

5. A support for the driving module of a driving computer game as recited in claim 1, whereas a support collar is affixed to said top surface of said floor platform to anchor said lower platform end of said support column to said floor platform.

6. A support for the driving module of a driving computer game as recited in claim 1, whereas a means such as a pawl and lever will allow said support column to be turned.

7. A support for the driving module of a driving computer game as recited in claim 1, whereas a means for adjusting the location of the accelerator module base is affixed to said top surface of said floor platform.

8. A support for the driving module of a driving computer game as recited in claim 1, whereas said support base has a cup holder ring on its periphery.

9. A support for the driving module of a driving computer game as recited in claim 1, wherein said support base provides raised areas to place the driving module (workpiece).

10. A support for the driving module of a driving computer game as recited in claim 9, wherein said support base consists of a topside plate and a bottom surface support plate.

11. A support for the driving module of a driving computer game as recited in claim 1, wherein a table support platform piece with a table support for a video is affixed to said floor platform.

12. A support for the driving module of a driving computer game as recited in claim 10, wherein the accelerator module base of the video games is reversible attached to the top surface of said floor platform in a cooperative manner with Velcro and rods; said rods are placed into one of several complimentary grooves; said complimentary grooves are on an adjustable plane which plane is adjustable and removable affixed to the upper surface of said platform with a bolt.

13. A support for the driving module (workpiece) of a driving computer game as recited in claim 1, wherein said support can be disassembled for selling or storage.

* * * * *